United States Patent
Kemp et al.

(10) Patent No.: US 12,198,562 B2
(45) Date of Patent: Jan. 14, 2025

(54) MONITORING AIRCRAFT TURBULENCE USING DATA FROM AN AUTOMATIC DEPENDENT SURVEILLANCE BROADCAST (ADS-B) RECEIVER

(71) Applicant: The Boeing Company, Chicago, IL (US)

(72) Inventors: Martin I. Kemp, Austin, TX (US); Cole Crawford, Austin, TX (US)

(73) Assignee: The Boeing Company, Arlington, VA (US)

(*) Notice: Subject to any disclaimer, the term of this patent is extended or adjusted under 35 U.S.C. 154(b) by 253 days.

(21) Appl. No.: 17/654,844

(22) Filed: Mar. 15, 2022

(65) Prior Publication Data
US 2023/0298476 A1    Sep. 21, 2023

(51) Int. Cl.
*G08G 5/00* (2006.01)
*B64D 45/00* (2006.01)

(52) U.S. Cl.
CPC .......... *G08G 5/0091* (2013.01); *B64D 45/00* (2013.01); *G08G 5/0004* (2013.01); *G08G 5/006* (2013.01); *B64D 2045/0085* (2013.01)

(58) Field of Classification Search
CPC .... G08G 5/0091; G08G 5/0004; G08G 5/006; B64D 45/00; B64D 2045/0085; G01W 1/00; G01W 2001/003; G01C 23/00
See application file for complete search history.

(56) References Cited

U.S. PATENT DOCUMENTS

| | | | |
|---|---|---|---|
| 7,598,901 B2 | 10/2009 | Tillotson et al. | |
| 8,629,788 B1* | 1/2014 | Greenleaf | G08G 5/0013 340/963 |
| 9,126,696 B1* | 9/2015 | Hampel | B64D 45/00 |
| 9,736,433 B2* | 8/2017 | Tillotson | G01W 1/10 |
| 9,881,507 B2* | 1/2018 | Rencher | G08G 5/0021 |
| 2011/0085698 A1* | 4/2011 | Tillotson | G01W 1/00 382/103 |
| 2020/0013300 A1 | 1/2020 | Reid et al. | |

(Continued)

OTHER PUBLICATIONS

European search opinion for EP 4246096. Retrieved on Apr. 16, 2024. URL is https://patentscope.wipo.int/search/en/detail.jsf?docId=EP407949960&_cid=P21-LV3503-17585-1 (Year: 2024).*

(Continued)

*Primary Examiner* — Calvin Cheung
(74) *Attorney, Agent, or Firm* — Harrity & Harrity, LLP (57) ABSTRACT

A method of management of a flight of an aircraft is provided. The method includes receiving a data stream from an automatic dependent surveillance broadcast (ADS-B) receiver during the flight, and the data stream includes an ADS-B message, a geographic position of the aircraft, and attitude and heading reference system (AHRS) data. The method includes accessing data that indicates a weight of the aircraft, identifying a force event experienced by the aircraft based on the geographic position, the AHRS data, and the weight of the aircraft, and classifying the force event by level of the force event, and by type of the force event as a turbulence event or a non-turbulence event. And the method includes outputting a report that indicates the force event as classified, at least when the force event is classified as a turbulence event.

20 Claims, 7 Drawing Sheets

(56) References Cited

U.S. PATENT DOCUMENTS

2020/0231298 A1\* 7/2020 Bilek .................. G08G 5/0091
2020/0334994 A1\* 10/2020 Jensen ................ G08G 5/0008
2021/0001998 A1 1/2021 Miller et al.
2021/0295719 A1 9/2021 Hampel et al.

OTHER PUBLICATIONS

Anonymous: "ADL170 ADL180 User Manual"; dated: Aug. 27, 2020; pp. 1-19; version 1.00; retrieved from internet at: http://golze.tech/downloads/ADL170_180_User_Manual_1_00.pdf (retrieved on Jul. 25, 2023).

\* cited by examiner

MONITORING AIRCRAFT TURBULENCE USING DATA FROM AN AUTOMATIC DEPENDENT SURVEILLANCE BROADCAST (ADS-B) RECEIVER

TECHNOLOGICAL FIELD

The present disclosure relates generally to flight management and, in particular, to flight management in which turbulence events are detected using data from an automatic dependent surveillance broadcast (ADS-B) receiver.

BACKGROUND

Clear air turbulence significantly affects the comfort of passengers on commercial aircraft and has even caused some would be passengers to forego flying due to their fears associated with the turbulence. Because clear air turbulence can occur with little or no warning, passengers tend to stay in their seats with their seat belts fastened. At times, though, every passenger must get up for comfort and physiological reasons.

It would generally be preferable for an aircraft to avoid the turbulence altogether, but even that preventative measure requires that the turbulence be detected or predicted before it occurs. While much turbulence (e.g. the turbulence associated with thunderstorms) can be predicted or detected, clear air turbulence cannot be detected or predicted by currently available technology. The reason that clear air turbulence cannot be detected is that it consists of masses of air having slightly different temperatures, pressures, and densities moving at various speeds and directions in the atmosphere. The minute differences in these air masses do not reflect radar differently enough to make the radar return from one mass of air distinguishable from the radar return from another mass of air.

While meteorological maps provide flight crews some indication of where turbulence might be expected, these maps are not perfect. First, they tend to become stale within hours and are based on underlying meteorological models that are far from perfect also. Additionally, turbulence occurs across a wide variety of geometric scales. Some turbulent areas can extend for many kilometers, or even hundreds of kilometers (e.g. the turbulent region surrounding the jet stream). Other areas of turbulence occur on the scale of kilometers or fractions of kilometers such as the turbulence associated with the downstream side of a mountain that is subjected to brief wind gusts of significant velocity. Due to their scale, these smaller volumes of turbulence will not appear on the meteorological maps.

In the absence of any better approach, the aviation industry has created a system in which the pilots of each aircraft radio in reports (PIREPs) of the clear air turbulence that they encounter on their routes, or "airways." These PIREPS include information such as approximate location and aircraft type. The Federal Aviation Administration (FAA) provides guidance as to determining the levels of turbulence experienced, but the level of turbulence experienced is subjective and not analytic.

It would therefore be desirable to have a system and method that takes into account at least some of the issues discussed above, as well as other possible issues.

BRIEF SUMMARY

Example implementations of the present disclosure are directed to flight management and, in particular, to flight management in which turbulence events are detected using data from an automatic dependent surveillance broadcast (ADS-B) receiver. In this regard, the ADS-B receiver is configured to communicate ADS-B messages to an electronic flight bag (EFB) used by flight crew members. According to example implementations of the present disclosure, the ADS-B receiver may be configured to provide attitude and heading reference system (AHRS) data such as rotation and acceleration of the aircraft, along with the ADS-B messages. The EFB may combine the AHRS data with flight information, and determine force events such as turbulence events experienced by the aircraft. The EFB may output a report of the force event, which may be displayed or communicated to flight dispatch, air traffic control or other aircraft.

The present disclosure thus includes, without limitation, the following example implementations.

Some example implementations provide a system for management of a flight of an aircraft, the system comprising: an automatic dependent surveillance broadcast (ADS-B) receiver configured to generate a data stream during the flight, the data stream including an ADS-B message, a geographic position of the aircraft, and attitude and heading reference system (AHRS) data; and an electronic flight bag (EFB) configured to at least: receive the data stream from the ADS-B receiver; access data that indicates a weight of the aircraft; identify a force event experienced by the aircraft based on the geographic position, the AHRS data, and the weight of the aircraft; classify the force event by level of the force event, and by type of the force event as a turbulence event or a non-turbulence event; and output a report that indicates the force event as classified, at least when the force event is classified as a turbulence event.

Some example implementations provide an apparatus for management of a flight of an aircraft, the apparatus comprising: a memory configured to store computer-readable program code; and processing circuitry configured to access the memory, and execute the computer-readable program code to cause the apparatus to at least: receive a data stream from an automatic dependent surveillance broadcast (ADS-B) receiver during the flight, the data stream including an ADS-B message, a geographic position of the aircraft, and attitude and heading reference system (AHRS) data; access data that indicates a weight of the aircraft; identify a force event experienced by the aircraft based on the geographic position, the AHRS data, and the weight of the aircraft; classify the force event by level of the force event, and by type of the force event as a turbulence event or a non-turbulence event; and output a report that indicates the force event as classified, at least when the force event is classified as a turbulence event.

Some example implementations provide a method of management of a flight of an aircraft, the method comprising: receiving a data stream from an automatic dependent surveillance broadcast (ADS-B) receiver during the flight, the data stream including an ADS-B message, a geographic position of the aircraft, and attitude and heading reference system (AHRS) data; accessing data that indicates a weight of the aircraft; identifying a force event experienced by the aircraft based on the geographic position, the AHRS data, and the weight of the aircraft; classifying the force event by level of the force event, and by type of the force event as a turbulence event or a non-turbulence event; and outputting a report that indicates the force event as classified, at least when the force event is classified as a turbulence event.

Some example implementations provide a computer-readable storage medium for management of a flight of an aircraft, the computer-readable storage medium being non-transitory and having computer-readable program code stored therein that, in response to execution by processing circuitry, causes an apparatus to at least: receive a data stream from an automatic dependent surveillance broadcast (ADS-B) receiver during the flight, the data stream including an ADS-B message, a geographic position of the aircraft, and attitude and heading reference system (AHRS) data; access data that indicates a weight of the aircraft; identify a force event experienced by the aircraft based on the geographic position, the AHRS data, and the weight of the aircraft; classify the force event by level of the force event, and by type of the force event as a turbulence event or a non-turbulence event; and output a report that indicates the force event as classified, at least when the force event is classified as a turbulence event.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to vehicular engineering and, in particular, to one or more of the design, construction, operation or use of vehicles. As used herein, a vehicle is a machine designed as an instrument of conveyance by land, water or air. A vehicle designed and configurable to fly may at times be referred to as an aerial vehicle, an aircraft or the like. Other examples of suitable vehicles include any of a number of different types of ground vehicles (e.g., motor vehicles, railed vehicles), watercraft, amphibious vehicles, spacecraft and the like.

A vehicle generally includes a basic structure, and a propulsion system coupled to the basic structure. The basic structure is the main supporting structure of the vehicle to which other components are attached. The basic structure is the load-bearing framework of the vehicle that structurally supports the vehicle in its construction and function. In various contexts, the basic structure may be referred to as a chassis, an airframe or the like.

The propulsion system includes one or more engines or motors configured to power one or more propulsors to generate propulsive forces that cause the vehicle to move. A propulsor is any of a number of different means of converting power into a propulsive force. Examples of suitable propulsors include rotors, propellers, wheels and the like. In some examples, the propulsion system includes a drivetrain configured to deliver power from the engines/motors to the propulsors. The engines/motors and drivetrain may in some contexts be referred to as the powertrain of the vehicle.

Figure 1:
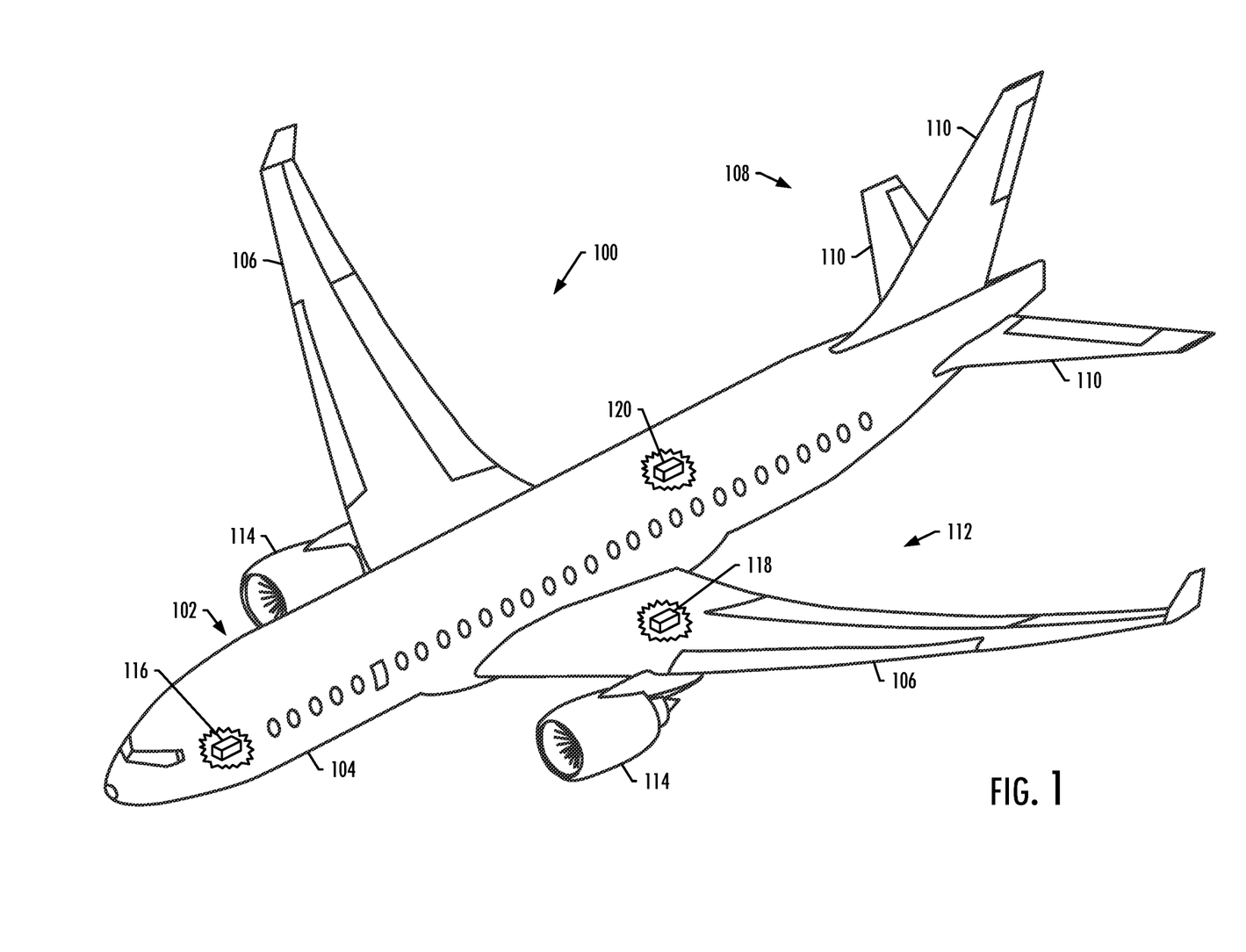
FIG. 1 illustrates one type of vehicle, namely, an aircraft that may benefit from example implementations of the present disclosure.

FIG. 1 illustrates one type of vehicle, namely, an aircraft 100 that may benefit from example implementations of the present disclosure. As shown, the aircraft includes a basic structure with an airframe 102 including a fuselage 104. The airframe also includes wings 106 that extend from opposing sides of the fuselage, an empennage or tail assembly 108 at a rear end of the fuselage, and the tail assembly includes stabilizers 110. The aircraft also includes a plurality of high-level systems 112 such as a propulsion system. In the particular example shown in FIG. 1, the propulsion system includes two wing-mounted engines 114 configured to power propulsors to generate propulsive forces that cause the aircraft to move. In other implementations, the propulsion system can include other arrangements, for example, engines carried by other portions of the aircraft including the fuselage and/or the tail. As also shown, the high-level systems may also include an electrical system 116, hydraulic system 118 and/or environmental system 120. Any number of other systems may be included.

As explained above, example implementations of the present disclosure relate generally to vehicular engineering and, in particular, to one or more of the design, construction, operation or use of vehicles such as aircraft 100. Thus, referring now to FIG. 2, example implementations may be used in the context of an aircraft manufacturing and service method 200. During pre-production, the example method may include specification and design 202 of the aircraft, manufacturing sequence and processing planning 204 and material procurement 206. During production, component and subassembly manufacturing 208 and system integration 210 of the aircraft takes place. Thereafter, the aircraft may go through certification and delivery 212 in order to be placed in service 214. While in service by an operator, the aircraft may be scheduled for maintenance and service (which may also include modification, reconfiguration, refurbishment or the like).

Each of the processes of the example method 200 may be performed or carried out by a system integrator, third party and/or operator (e.g., customer). For the purposes of this description, a system integrator may include for example any number of aircraft manufacturers and major-system subcontractors; a third party may include for example any number of vendors, subcontractors and suppliers; and an operator may include for example an airline, leasing company, military entity, service organization or the like.

Figure 2:
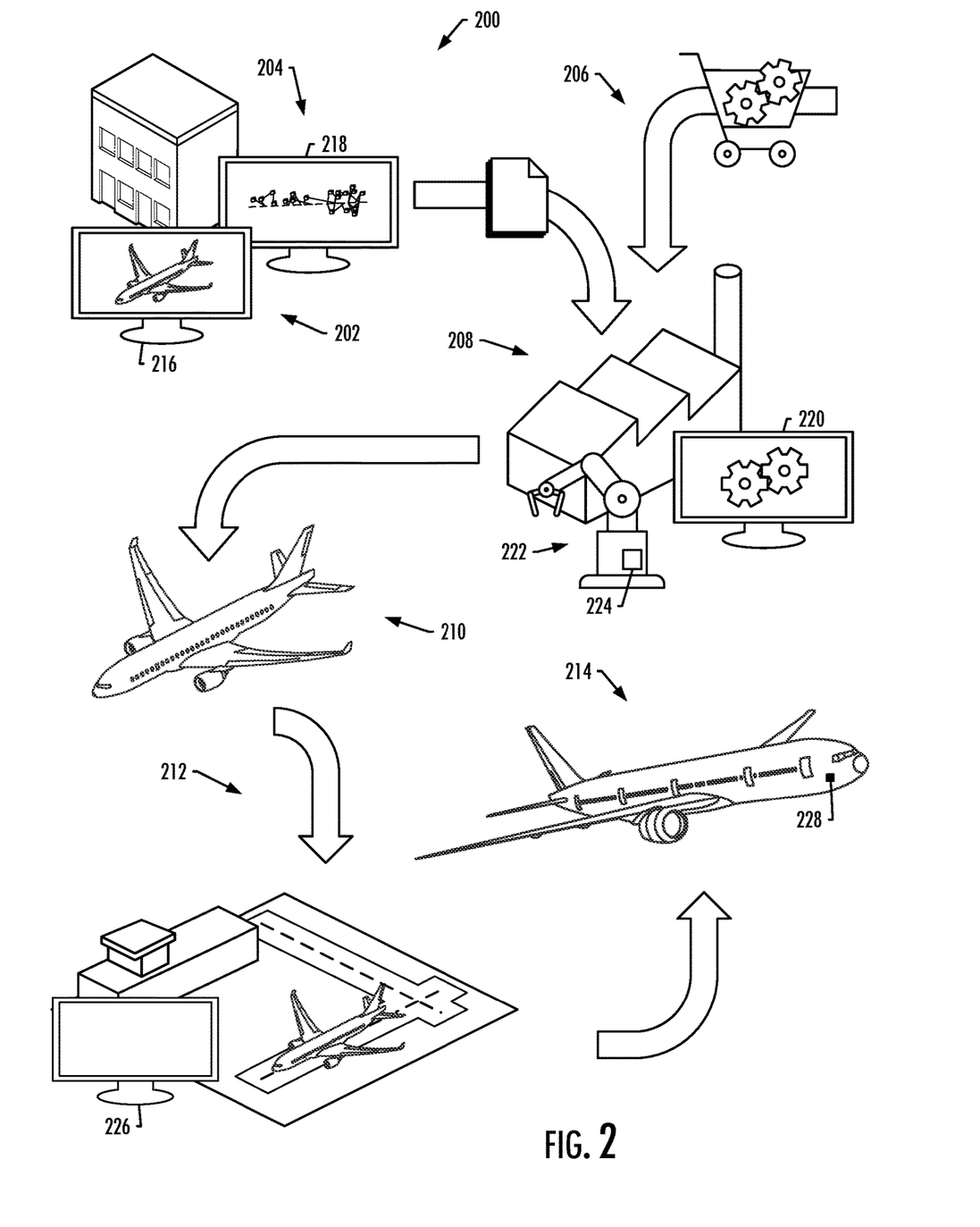
FIG. 2 illustrates an aircraft manufacturing and service method, according to some example implementations.

As will also be appreciated, computers are often used throughout the method 200; and in this regard, a "computer" is generally a machine that is programmable or programmed to perform functions or operations. The method as shown makes use of a number of example computers. These computers include computers 216, 218 used for the specification and design 202 of the aircraft, and the manufacturing sequence and processing planning 204. The method may also make use of computers 220 during component and subassembly manufacturing 208, which may also make use of computer numerical control (CNC) machines 222 or other robotics that are controlled by computers 224. Even further, computers 226 may be used while the aircraft is in service 214, as well as during maintenance and service; and as suggested in FIG. 1, the aircraft may itself include one or more computers 228 as part of or separate from its electrical system 116.

A number of the computers 216-228 used in the method 200 may be co-located or directly coupled to one another, or in some examples, various ones of the computers may communicate with one another across one or more computer networks. Further, although shown as part of the method, it should be understood that any one or more of the computers may function or operate separate from the method, without regard to any of the other computers. It should also be understood that the method may include one or more additional or alternative computers than those shown in FIG. 2.

Example implementations of the present disclosure may be implemented throughout the aircraft manufacturing and service method 200, but are particularly well suited for implementation during in-service. In this regard, some example implementations provide a system and method for management of a flight of an aircraft 100, which may be implemented by computers 228 onboard the aircraft. As explained in greater detail below, these computers may include an automatic dependent surveillance broadcast (ADS-B) receiver and an electronic flight bag (EFB).

As is known, ADS-B is a surveillance technology for tracking aircraft that uses satellite-based navigation technology and a broadcast communications data-link. An aircraft that is an ADS-B capable aircraft may use a satellite navigation receiver to derive its precise geographic position from satellites, and combine that geographic position with state information such as altitude, track, speed and flight number. An ADS-B receiver may be configured to receive ADS-B messages such as from other aircraft, and communicate those ADS-B messages to the EFB. The EFB is an electronic information management device used by flight crew members to perform flight management tasks; and in this regard, the EFB may be configured to interface with the ADS-B receiver.

Figure 3:
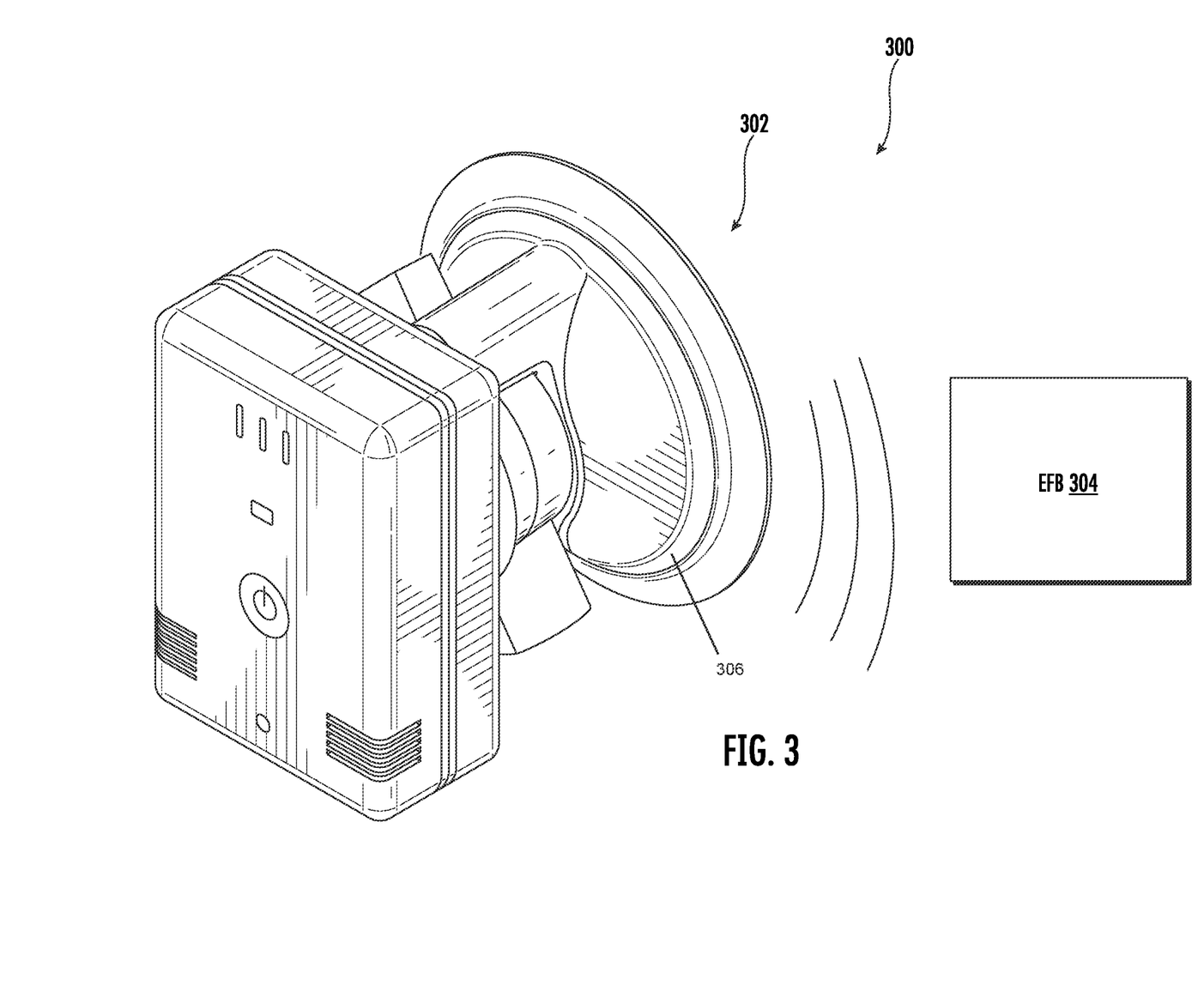
FIG. 3 illustrates a system for management of a flight of an aircraft, including an automatic dependent surveillance broadcast (ADS-B) receiver and an electronic flight bag (EFB), according to some example implementations of the present disclosure.

FIG. 3 illustrates a system 300 for management of a flight of an aircraft 100, according to some example implementations of the present disclosure. As shown, the system includes an ADS-B receiver 302 and an EFB 304. In some examples, the ADS-B receiver is portable and may be temporarily installed in an aircraft, such as using a mount 306 such as a suction-cup mount configured to removably mount the ADS-B receiver to a surface inside the aircraft, such as a windshield of the aircraft.

The ADS-B receiver 302 is configured to generate a data stream during the flight, and the data stream includes an ADS-B message, a geographic position of the aircraft, and attitude and heading reference system (AHRS) data. The EFB 304 is configured to receive the data stream from the ADS-B receiver. The EFB is configured to access data that indicates a weight of the aircraft, and identify a force event experienced by the aircraft based on the geographic position, the AHRS data, and the weight of the aircraft. The EFB is configured to classify the force event by level of the force event, and by type of the force event as a turbulence event or a non-turbulence event.

The EFB 304 is configured to output a report that indicates the force event as classified, at least when the force event is classified as a turbulence event. In some examples, the EFB includes a display, and the EFB is configured to output the report for presentation on the display. Additionally or alternatively, in some examples, the EFB includes a communication interface, and the EFB is configured to output the report for communication over the communication interface to at least one of flight dispatch, air traffic control or other aircraft. Example implementations may therefore leverage connectivity of the EFB to report the force event, at least when the force event is classified as a turbulence event.

Figure 4:
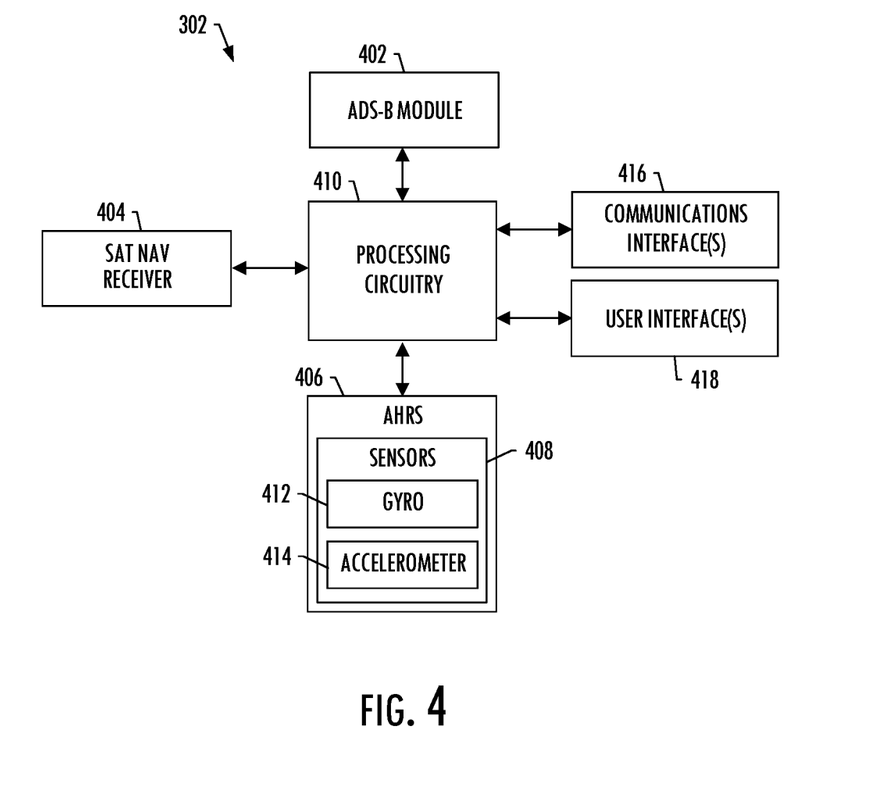
FIG. 4 illustrates more particularly illustrates the ADS-B receiver, according to some example implementations.

FIG. 4 more particularly illustrates the ADS-B receiver 302 according to some examples. As shown, the ADS-B receiver includes an ADS-B module 402, a satellite navigation receiver 404, an AHRS 406 including sensors 408, and processing circuitry 410. The ADS-B module is configured to receive the ADS-B message, such as from another aircraft. The satellite navigation receiver is configured to determine the geographic position of the aircraft from location information received from a satellite navigation system. The AHRS includes the sensors configured to measure or determine the AHRS data. And the processing circuitry is configured to generate the data stream that includes the ADS-B message, the geographic position and the AHRS data.

The ADS-B module 402 may provide inflight weather traffic and other information to users of the ADS-B receiver 302. Broadly speaking, the ADS-B module receives ADS-B messages. More specifically, weather and other information such as notices to airmen (NOTAMs) may be obtained using the Flight Information System Broadcast (FIS-B) service. Further, traffic may be obtained using the Traffic Information System Broadcast (TIS-B) service. In one or more example implementations, the ADS-B module operates in the ADS-B In mode. The signals for the FIS-B and/or TIS-B services may be received from ground towers and/or air-to-air. The ADS-B module is an ADS-B circuitry that may include antennas, signal processing circuitry, processors, and a communication interface to output the received information to the processing circuitry 410. In one or more example implementations, an extended GDL90 protocol is used for the communications of the ADS-B module.

The satellite navigation receiver 404 may provide location information. The location information may be available to the aircraft crew computing devices and may be used, for example, to update the current location in a displayed map, which may then be used for other functionalities such as traffic display functions, including the filtering of distant traffic and traffic alerting. In addition, a current time obtained from the satellite navigation receiver may be used by the ADS-B receiver 302 to maintain an internal time, which may be used for logging events, etc. The satellite navigation receiver may support various satellite navigation systems including Global Navigation Satellite Systems (GNSS) such as the Global Positioning System (GPS) including Wide Area Augmentation System (WAAS), Galileo, GLONASS, and BeiDu. The satellite navigation receiver may digitally interface with the processing circuitry 410 to provide the location information.

The AHRS 406 may be used as a backup system for a real-time depiction of the aircraft's attitude. For example, pitch and bank of the aircraft may be displayed by the EFB 304. The AHRS may include sensors 408 for multi-axis attitude sensing. Sensors for roll, pitch, and/or yaw may be used. The sensors may include one or more of a number of different types of sensors, such as a gyroscope 412, accelerometer 414, and/or magnetometers. In this regard, the gyroscope may be configured to measure a rotation of the aircraft, and the accelerometer may be configured to measure an acceleration of the aircraft; and the AHRS data may therefore include the rotation and the acceleration of the aircraft. Multiple sensory modalities may be combined using methods for sensor data fusion. The AHRS may be calibrated and re-calibrated to provide accurate AHRS data regardless of the mounting position/orientation of the ADS-B receiver 302. The AHRS may digitally interface with the processing circuitry 410 to provide the attitude information.

As also shown, in some examples, the ADS-B receiver 302 includes one or more communications interfaces 416 configured to transmit and/or receive information, such as the data stream that may be transmitted to the EFB 304. Likewise, the ADS-B receiver may include one or more user interfaces 418 such as displays, user input interfaces or the like.

Returning to FIG. 3, the force event may be identified by the EFB 304 in a number of different manners. In some examples, the EFB is configured to determine a force vector applied to the aircraft based on the geographic position, the rotation, the acceleration, and the weight; and identify the force event from the force vector. In some even further examples, determination of the force vector includes the EFB configured to determine an acceleration vector of the aircraft based on the geographic position, the rotation and the acceleration. And in these examples, the EFB is configured to determine the force vector applied to the aircraft based on the acceleration vector, and the weight of the aircraft.

In some examples, the force event is classified by level selected from a plurality of levels of increasing severity of the force event, such as "chop," "light," "moderate," "severe," and "extreme." Similarly, in some examples, the force event is classified by type in which the non-turbulence event indicates one of a plurality of non-turbulence events that include takeoff, maneuvering, and landing of the aircraft.

Figure 5A:
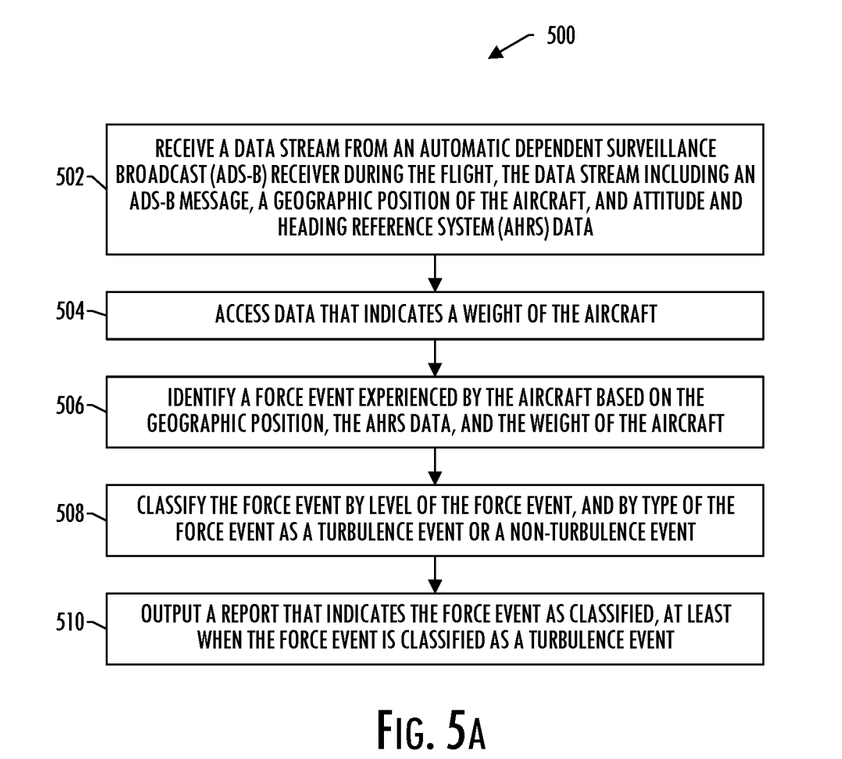
FIGS. 5A, 5B and 5C are flowcharts illustrating various steps in a method of management of a flight of an aircraft, according to example implementations.
Figure 5B:
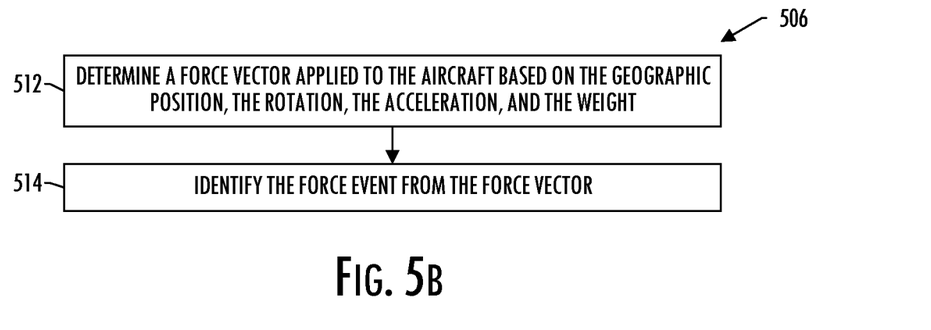
Figure 5C:
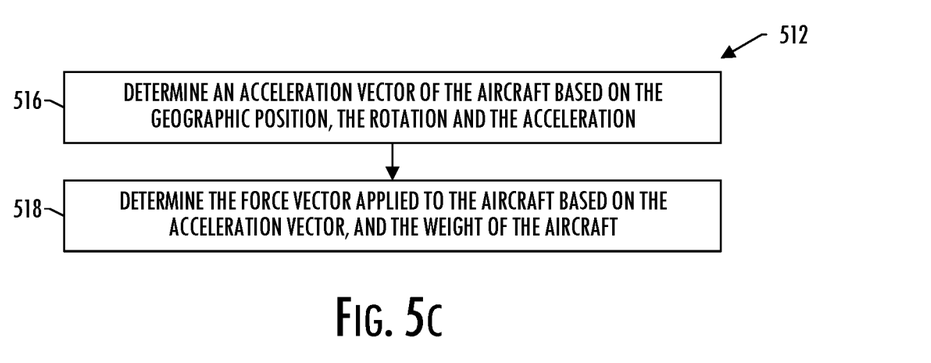

FIGS. 5A-5C are flowcharts illustrating various steps in a method 500 of management of a flight of an aircraft, according to various example implementations of the present disclosure. The method includes receiving a data stream from an automatic dependent surveillance broadcast (ADS-B) receiver during the flight, the data stream including an ADS-B message, a geographic position of the aircraft, and attitude and heading reference system (AHRS) data, as shown at block 502 of FIG. 5A. The method includes accessing data that indicates a weight of the aircraft, as shown at block 504. The method includes identifying a force event experienced by the aircraft based on the geographic position, the AHRS data, and the weight of the aircraft, as shown at block 506. The method includes classifying the force event by level of the force event, and by type of the force event as a turbulence event or a non-turbulence event, as shown at block 508. And the method includes outputting a report that indicates the force event as classified, at least when the force event is classified as a turbulence event, as shown at block 510.

In some examples, the AHRS data includes a rotation and an acceleration of the aircraft, and identifying the force event at block 506 includes determining a force vector applied to the aircraft based on the geographic position, the rotation, the acceleration, and the weight, as shown at block 512 of FIG. 5B. And in some of these examples, the force event is identified from the force vector, as shown at block 514.

In some examples, determining the force vector at block 512 includes determining an acceleration vector of the aircraft based on the geographic position, the rotation and the acceleration, as shown at block 516 of FIG. 5C. And in some of these examples, the force vector applied to the aircraft is determined based on the acceleration vector, and the weight of the aircraft, as shown at block 518.

In some examples, the force event is classified at block 508 by level selected from a plurality of levels of increasing severity of the force event.

In some examples, the force event is classified at block 508 by type in which the non-turbulence event indicates one of a plurality of non-turbulence events that include takeoff, maneuvering, and landing of the aircraft.

In some examples, the method is performed by an electronic flight bag (EFB) onboard the aircraft.

In some examples, the report is output at block 510 for presentation on a display of the EFB.

In some examples, the report is output at block 510 by the EFB for communication over a communication interface of the EFB to at least one of flight dispatch, air traffic control or other aircraft.

According to example implementations of the present disclosure, the EFB 304 may be implemented by various means. Means for implementing the EFB may include hardware, alone or under direction of one or more computer programs from a computer-readable storage medium. In some examples, one or more apparatuses may be configured to function as or otherwise implement the EFB. In examples involving more than one apparatus, the respective apparatuses may be connected to or otherwise in communication with one another in a number of different manners, such as directly or indirectly via a wired or wireless network or the like.

Figure 6:
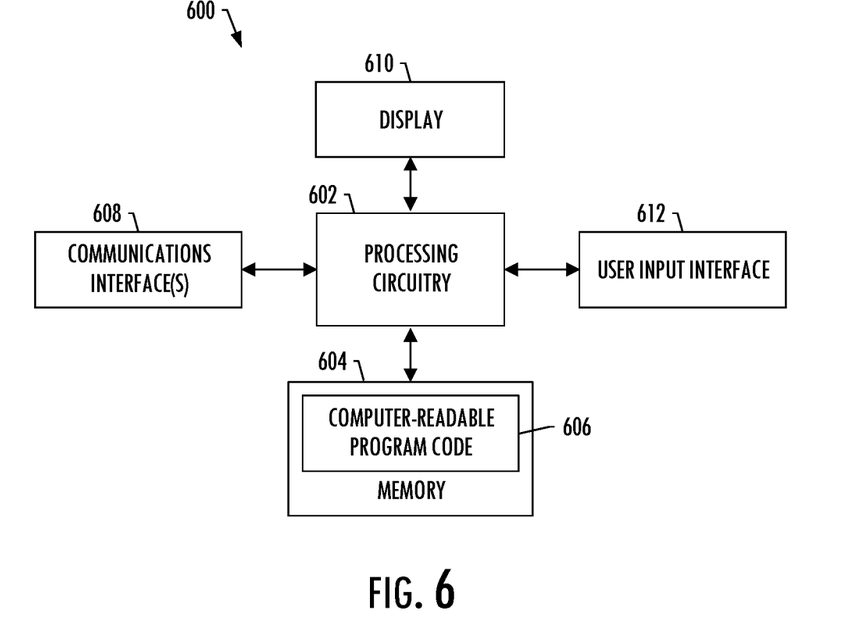
FIG. 6 illustrates an apparatus that may be configured to implement the EFB, according to some example implementations.

FIG. 6 illustrates an apparatus 600 that may be configured to implement the EFB 304, according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 602 (e.g., processor unit) connected to a memory 604 (e.g., storage device).

The processing circuitry 602 of the EFB 304 (as well as the processing circuitry 410 of the ADS-B receiver 302) may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 604 (of the same or another apparatus).

The processing circuitry 602 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 604 is generally any piece of computer hardware that is capable of storing information such as, for example, data, computer programs (e.g., computer-readable program code 606) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 604, the processing circuitry 602 may also be connected to one or more interfaces for displaying, transmitting and/or receiving information. Similar to the ADS-B receiver 302, interfaces of the apparatus 600 may include a communications interface 608 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 610 and/or one or more user input interfaces 612 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 600 may include a processing circuitry 602 and a computer-readable storage medium or memory 604 coupled to the processing circuitry, where the processing circuitry is configured to execute computer-readable program code 606 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. A system for management of a flight of an aircraft, the system comprising: an automatic dependent surveillance broadcast (ADS-B) receiver configured to generate a data stream during the flight, the data stream including an ADS-B message, a geographic position of the aircraft, and attitude and heading reference system (AHRS) data; and an electronic flight bag (EFB) configured to at least: receive the data stream from the ADS-B receiver; access data that indicates a weight of the aircraft; identify a force event experienced by the aircraft based on the geographic position, the AHRS data, and the weight of the aircraft; classify the force event by level of the force event, and by type of the force event as a turbulence event or a non-turbulence event; and output a report that indicates the force event as classified, at least when the force event is classified as a turbulence event.

Clause 2. The system of clause 1, wherein the ADS-B receiver includes a mount configured to removably mount the ADS-B receiver to a surface inside the aircraft.

Clause 3. The system of clause 1 or clause 2, wherein the ADS-B receiver includes: an ADS-B module configured to receive the ADS-B message; a satellite navigation receiver configured to determine the geographic position of the aircraft from location information received from a satellite navigation system; an AHRS including sensors configured to measure or determine the AHRS data; and processing circuitry configured to generate the data stream that includes the ADS-B message, the geographic position and the AHRS data.

Clause 4. The system of clause 3, wherein the sensors of the AHRS include a gyroscope configured to measure a rotation of the aircraft, and an accelerometer configured to measure an acceleration of the aircraft, and wherein the AHRS data includes the rotation and the acceleration of the aircraft.

Clause 5. The system of clause 4, wherein the EFB configured to identify the force event includes the EFB configured to: determine a force vector applied to the aircraft based on the geographic position, the rotation, the acceleration, and the weight; and identify the force event from the force vector.

Clause 6. The system of clause 5, wherein the EFB configured to determine the force vector includes the EFB configured to: determine an acceleration vector of the aircraft based on the geographic position, the rotation and the acceleration; and determine the force vector applied to the aircraft based on the acceleration vector, and the weight of the aircraft.

Clause 7. The system of any of clauses 1 to 6, wherein the force event is classified by level selected from a plurality of levels of increasing severity of the force event.

Clause 8. The system of any of clauses 1 to 7, wherein the force event is classified by type in which the non-turbulence event indicates one of a plurality of non-turbulence events that include takeoff, maneuvering, and landing of the aircraft.

Clause 9. The system of any of clauses 1 to 8, wherein the EFB includes a display, and the EFB is configured to output the report for presentation on the display.

Clause 10. The system of any of clauses 1 to 9, wherein the EFB includes a communication interface, and the EFB is configured to output the report for communication over the communication interface to at least one of flight dispatch, air traffic control or other aircraft.

Clause 11. An apparatus for management of a flight of an aircraft, the apparatus comprising: a memory configured to store computer-readable program code; and processing circuitry configured to access the memory, and execute the computer-readable program code to cause the apparatus to at least: receive a data stream from an automatic dependent surveillance broadcast (ADS-B) receiver during the flight, the data stream including an ADS-B message, a geographic position of the aircraft, and attitude and heading reference system (AHRS) data; access data that indicates a weight of the aircraft; identify a force event experienced by the aircraft based on the geographic position, the AHRS data, and the weight of the aircraft; classify the force event by level of the force event, and by type of the force event as a turbulence event or a non-turbulence event; and output a report that indicates the force event as classified, at least when the force event is classified as a turbulence event.

Clause 12. The apparatus of clause 11, wherein the AHRS data includes a rotation and an acceleration of the aircraft, and the apparatus caused to identify the force event includes the apparatus caused to: determine a force vector applied to the aircraft based on the geographic position, the rotation, the acceleration, and the weight; and identify the force event from the force vector.

Clause 13. The apparatus of clause 12, wherein the apparatus caused to determine the force vector includes the apparatus caused to: determine an acceleration vector of the aircraft based on the geographic position, the rotation and the acceleration; and determine the force vector applied to the aircraft based on the acceleration vector, and the weight of the aircraft.

Clause 14. The apparatus of any of clauses 11 to 13, wherein the force event is classified by level selected from a plurality of levels of increasing severity of the force event.

Clause 15. The apparatus of any of clauses 11 to 14, wherein the force event is classified by type in which the non-turbulence event indicates one of a plurality of non-turbulence events that include takeoff, maneuvering, and landing of the aircraft.

Clause 16. The apparatus of any of clauses 11 to 15, wherein the apparatus is configured to implement an electronic flight bag (EFB) onboard the aircraft.

Clause 17. The apparatus of clause 16, wherein the report is output for presentation on a display of the EFB.

Clause 18. The apparatus of clause 16 or clause 17, wherein the report is output by the EFB for communication over a communication interface of the EFB to at least one of flight dispatch, air traffic control or other aircraft.

Clause 19. A method of management of a flight of an aircraft, the method comprising: receiving a data stream from an automatic dependent surveillance broadcast (ADS-B) receiver during the flight, the data stream including an ADS-B message, a geographic position of the aircraft, and attitude and heading reference system (AHRS) data; accessing data that indicates a weight of the aircraft; identifying a force event experienced by the aircraft based on the geographic position, the AHRS data, and the weight of the aircraft; classifying the force event by level of the force event, and by type of the force event as a turbulence event or a non-turbulence event; and outputting a report that indicates the force event as classified, at least when the force event is classified as a turbulence event.

Clause 20. The method of clause 19, wherein the AHRS data includes a rotation and an acceleration of the aircraft, and identifying the force event includes: determining a force vector applied to the aircraft based on the geographic position, the rotation, the acceleration, and the weight; and identifying the force event from the force vector.

Clause 21. The method of clause 20, wherein determining the force vector includes: determining an acceleration vector of the aircraft based on the geographic position, the rotation and the acceleration; and determining the force vector applied to the aircraft based on the acceleration vector, and the weight of the aircraft.

Clause 22. The method of any of clauses 19 to 21, wherein the force event is classified by level selected from a plurality of levels of increasing severity of the force event.

Clause 23. The method of any of clauses 19 to 22, wherein the force event is classified by type in which the non-turbulence event indicates one of a plurality of non-turbulence events that include takeoff, maneuvering, and landing of the aircraft.

Clause 24. The method of any of clauses 19 to 23, wherein the method is performed by an electronic flight bag (EFB) onboard the aircraft.

Clause 25. The method of clause 24, wherein the report is output for presentation on a display of the EFB.

Clause 26. The method of clause 24 or clause 25, wherein the report is output by the EFB for communication over a communication interface of the EFB to at least one of flight dispatch, air traffic control or other aircraft.

Clause 27. A computer-readable storage medium for management of a flight of an aircraft, the computer-readable storage medium being non-transitory and having computer-readable program code stored therein that, in response to execution by processing circuitry, causes an apparatus to at least: receive a data stream from an automatic dependent surveillance broadcast (ADS-B) receiver during the flight, the data stream including an ADS-B message, a geographic position of the aircraft, and attitude and heading reference system (AHRS) data; access data that indicates a weight of the aircraft; identify a force event experienced by the aircraft based on the geographic position, the AHRS data, and the weight of the aircraft; classify the force event by level of the force event, and by type of the force event as a turbulence event or a non-turbulence event; and output a report that indicates the force event as classified, at least when the force event is classified as a turbulence event.

Clause 28. The computer-readable storage medium of clause 27, wherein the AHRS data includes a rotation and an acceleration of the aircraft, and the apparatus caused to identify the force event includes the apparatus caused to: determine a force vector applied to the aircraft based on the geographic position, the rotation, the acceleration, and the weight; and identify the force event from the force vector.

Clause 29. The computer-readable storage medium of clause 28, wherein the apparatus caused to determine the force vector includes the apparatus caused to: determine an acceleration vector of the aircraft based on the geographic position, the rotation and the acceleration; and determine the force vector applied to the aircraft based on the acceleration vector, and the weight of the aircraft.

Clause 30. The computer-readable storage medium of any of clauses 27 to 29, wherein the force event is classified by level selected from a plurality of levels of increasing severity of the force event.

Clause 31. The computer-readable storage medium of any of clauses 27 to 30, wherein the force event is classified by type in which the non-turbulence event indicates one of a plurality of non-turbulence events that include takeoff, maneuvering, and landing of the aircraft.

Clause 32. The computer-readable storage medium of any of clauses 27 to 31, wherein the apparatus is configured to implement an electronic flight bag (EFB) onboard the aircraft.

Clause 33. The computer-readable storage medium of clause 32, wherein the report is output for presentation on a display of the EFB.

Clause 34. The computer-readable storage medium of clause 32 or clause 33, wherein the report is output by the EFB for communication over a communication interface of the EFB to at least one of flight dispatch, air traffic control or other aircraft.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for management of a flight of an aircraft, the system comprising:
an automatic dependent surveillance broadcast (ADS-B) receiver configured to generate a data stream during the flight, the data stream including an ADS-B message, a geographic position of the aircraft, and attitude and heading reference system (AHRS) data; and
an electronic flight bag (EFB) configured to at least:
receive the data stream from the ADS-B receiver;
access data that indicates a weight of the aircraft;
identify a force event experienced by the aircraft based on the geographic position, the AHRS data, and the weight of the aircraft;
classify the force event by level of the force event, and by type of the force event as a turbulence event or a non-turbulence event; and
output a report that indicates the force event as classified, at least when the force event is classified as the turbulence event;
wherein the ADS-B receiver includes:
an ADS-B module configured to receive the ADS-B message;
a satellite navigation receiver configured to determine the geographic position of the aircraft from location information received from a satellite navigation system;
an AHRS including sensors configured to measure or determine the AHRS data; and
processing circuitry configured to generate the data stream that includes the ADS-B message, the geographic position and the AHRS data; and
wherein the force event is classified by type in which the non-turbulence event indicates one of a plurality of non-turbulence events that include takeoff, maneuvering, and landing of the aircraft.

2. The system of claim 1, wherein the ADS-B receiver includes a mount configured to removably mount the ADS-B receiver to a surface inside the aircraft.

3. The system of claim 1, wherein the sensors of the AHRS include a gyroscope configured to measure a rotation of the aircraft, and an accelerometer configured to measure an acceleration of the aircraft, and
wherein the AHRS data includes the rotation and the acceleration of the aircraft.

4. The system of claim 3, wherein the EFB configured to identify the force event includes the EFB configured to:
determine a force vector applied to the aircraft based on the geographic position, the rotation, the acceleration, and the weight; and
identify the force event from the force vector.

5. The system of claim 4, wherein the EFB configured to determine the force vector includes the EFB configured to:
determine an acceleration vector of the aircraft based on the geographic position, the rotation and the acceleration; and
determine the force vector applied to the aircraft based on the acceleration vector, and the weight of the aircraft.

6. The system of claim 1, wherein the force event is classified by level selected from a plurality of levels of increasing severity of the force event.

7. The system of claim 1, wherein the EFB includes a display, and the EFB is configured to output the report for presentation on the display.

8. The system of claim 1, wherein the EFB includes a communication interface, and the EFB is configured to output the report for communication over the communication interface to at least one of flight dispatch, air traffic control or other aircraft.

9. An apparatus for management of a flight of an aircraft, the apparatus comprising:
a memory configured to store computer-readable program code; and
processing circuitry configured to access the memory, and execute the computer-readable program code to cause the apparatus to at least:
receive a data stream from an automatic dependent surveillance broadcast (ADS-B) receiver during the flight, the data stream including an ADS-B message, a geographic position of the aircraft, and attitude and heading reference system (AHRS) data, wherein an AHRS includes sensors configured to measure or determine the AHRS data, wherein processing circuitry is configured to generate the data stream that includes the ADS-B message, the geographic position and the AHRS data;
access data that indicates a weight of the aircraft;
identify a force event experienced by the aircraft based on the geographic position, the AHRS data, and the weight of the aircraft;
classify the force event by level of the force event, and by type of the force event as a turbulence event or a non-turbulence event;
output a report that indicates the force event as classified, at least when the force event is classified as the turbulence event; and
wherein the AHRS data includes a rotation and an acceleration of the aircraft, and the apparatus caused to identify the force event includes the apparatus caused to:
determine a force vector applied to the aircraft based on the geographic position, the rotation, the acceleration, and the weight; and
identify the force event from the force vector.

10. The apparatus of claim 9, wherein the apparatus caused to determine the force vector includes the apparatus caused to:
determine an acceleration vector of the aircraft based on the geographic position, the rotation and the acceleration; and
determine the force vector applied to the aircraft based on the acceleration vector, and the weight of the aircraft.

11. The apparatus of claim 9, wherein the force event is classified by level selected from a plurality of levels of increasing severity of the force event.

12. The apparatus of claim 9, wherein the force event is classified by type in which the non-turbulence event indicates one of a plurality of non-turbulence events that include takeoff, maneuvering, and landing of the aircraft.

13. The apparatus of claim 9, wherein the apparatus is configured to implement an electronic flight bag (EFB) onboard the aircraft.

14. The apparatus of claim 13, wherein the report is output for presentation on a display of the EFB.

15. The apparatus of claim 13, wherein the report is output by the EFB for communication over a communication interface of the EFB to at least one of flight dispatch, air traffic control or other aircraft.

16. A method of management of a flight of an aircraft, the method comprising:

receiving a data stream from an automatic dependent surveillance broadcast (ADS-B) receiver during the flight, the data stream including an ADS-B message, a geographic position of the aircraft, and attitude and heading reference system (AHRS) data, wherein an AHRS includes sensors configured to measure or determine the AHRS data, wherein processing circuitry is configured to generate the data stream that includes the ADS-B message, the geographic position and the AHRS data;

accessing data that indicates a weight of the aircraft;

identifying a force event experienced by the aircraft based on the geographic position, the AHRS data, and the weight of the aircraft;

classifying the force event by level of the force event, and by type of the force event as a turbulence event or a non-turbulence event;

outputting a report that indicates the force event as classified, at least when the force event is classified as the turbulence event; and wherein the AHRS data includes a rotation and an acceleration of the aircraft, and identifying the force event includes:

determining a force vector applied to the aircraft based on the geographic position, the rotation, the acceleration, and the weight; and identifying the force event from the force vector.

17. The method of claim 16, wherein determining the force vector includes:

determining an acceleration vector of the aircraft based on the geographic position, the rotation and the acceleration; and determining the force vector applied to the aircraft based on the acceleration vector, and the weight of the aircraft.

18. The method of claim 16, wherein the force event is classified by level selected from a plurality of levels of increasing severity of the force event.

19. The method of claim 16, wherein the force event is classified by type in which the non-turbulence event indicates one of a plurality of non-turbulence events that include takeoff, maneuvering, and landing of the aircraft.

20. The method of claim 16, wherein the method is performed by an electronic flight bag (EFB) onboard the aircraft.

* * * * *